United States Patent [19]

Brandao et al.

[11] Patent Number: 4,855,748
[45] Date of Patent: Aug. 8, 1989

[54] TCAS BEARING ESTIMATION RECEIVER USING A 4 ELEMENT ANTENNA

[75] Inventors: Ruy L. Brandao, Ft. Lauderdale; Constantinos S. Kyriakos, Boca Raton; Randall C. Spires, Ft. Lauderdale; Andrejs Jugs, Boca Raton, all of Fla.

[73] Assignee: Allied-Signal Inc., Morris Township, Morris County, N.J.

[21] Appl. No.: 170,227

[22] Filed: Mar. 18, 1988

[51] Int. Cl.[4] ............................................. G01S 3/02
[52] U.S. Cl. .................................. 342/455; 342/374; 342/420; 364/461
[58] Field of Search ............... 342/455, 374, 420, 442; 364/461

[56] References Cited

U.S. PATENT DOCUMENTS

4,395,778  7/1983  Osada et al. .

Primary Examiner—Theodore M. Blum
Attorney, Agent, or Firm—Howard G. Massung

[57] ABSTRACT

A direction finding receiving system for use on a protected aircraft in which a signal from an ATCRABS transponder on an intruder aircraft is received has been described incorporating a four element interferometer type antenna array, reversing switches, individual receivers, a phase detector and a processor for processing the outputs of the phase detector. The invention overcomes the problem of correcting for the difference in phase delay of signals passing through the receivers.

16 Claims, 7 Drawing Sheets

TCAS BEARING ESTIMATION RECEIVER USING A 4 ELEMENT ANTENNA

The present invention relates to a direction finding antenna system. More particularly, it relates to a four element array of the interferometer type particularly suited for determining the relative bearing of an intruding aircraft from a protected aircraft in conjunction with the Traffic Alert Collision Avoidance System (TCAS).

Document RTCA/DO-185 "Minimum Operational Performance Standards for Traffic Alert and Collision Avoidance System", published September, 1983, by the Radio Technical Commission for Aeronautics, Washington, D.C., 20005 broadly describes TCAS in the following terms:

TCAS is most readily understood by visualizing its operation in flight. When airborne, the TCAS equipment located aboard a protected aircraft periodically transmits interrogation signals. These interrogations are received by Air Traffic Control Radar Beacon Systems (ATCRBS) or Mode S altitude reporting transponders located aboard other aircraft, herein referred to as intruding aircraft in the vicinity of the protected aircraft. In reply to the interrogations, the transponder of the intruding aircraft transmits a signal which reports its altitude. The TCAS equipment computes the range of the intruding aircraft by using the round-trip time between the transmission of the interrogation and the receipt of the reply.

Altitude, altitude rate, range and range rate are determined by tracking the reply information. These data, together with the current TCAS sensitivity level (which specifies the protected volume around the aircraft) are used to determine whether the intruding aircraft is a threat. Each threat aircraft is processed individually to permit selection of the minimum safe resolution advisory based on track data and coordination with other TCAS-equipped aircraft.

If the treat detection logic in the TCAS computer determines that a proximate aircraft represents a potential collision or near-miss encounter, the computer threat resolution logic determines the appropriate vertical maneuver (dive or climb) that will ensure the safe separation of the TCAS aircraft. The appropriate maneuver is one that ensure adequate vertical separation while causing the least deviation of the TCAS aircraft from its current vertical rate.

The TCAS described in the RTCA/DO-185 document provides advisories only for vertical maneuvers of the protected aircraft to escape collision with a threat aircraft. An improved TCAS has been demonstrated which provides advisories for horizontal maneuvers (turn right or turn left) as well as for vertical maneuvers, thereby further reducing the probability of collision.

Improved TCAS requires knowledge of the relative bearing of the intruding aircraft from the protected aircraft, in addition to the other data collected by TCAS in order to function.

U.S. Pat. No. 4,414,550 for "Low Profile Circular Array Antenna" by C. P. Tresselt issued Nov. 8, 1983 discloses an eight element circular array antenna with direction finding capability by virtue of a Butler beam forming matix used in conjunction therewith. An antenna of this type has been used successfully in the improved TCAS to provide information of the bearing of intruding aircraft. However, such an antenna is costly to manufacture, complicated to install and difficult to maintain in the milieu of commercial air transport service.

U.S. Pat. No. 3,792,472 for "Warning Indicator to Alert Aircraft Pilot Presence and Bearing of Other Aircraft" by D. V. Payne et al. issued Feb. 12, 1974, discloses a five element antenna system for receiving ATCRBS reply signals from intruding aircraft and providing the approximate relative bearing to an intruding aircraft. The Payne et al. invention utilizes an antenna having four elements spaced at 90° intervals about the circumference of a circle having a fifth element at its center. The bearing of an intruding aircraft is determined, within an accuracy of $\pm 22 \frac{1}{2}°$, by comparing individually the phases of the signals received by the circumferential elements with that of the signal received by the center element.

The present invention employs an antenna array of the interferometer type comprising two pairs of antenna elements with the elements spaced equally, i.e. at 90° intervals, about the circumference of a circle. The elements of one pair (first and third elements) are aligned on an axis which is perpendicular to the axis of the other pair (second and fourth elements). The phase difference between a signal arriving from a distance source at the first element and the signal from the same source arriving at the third element is proportional to $\sin \beta$, where $\beta$ is the angle between the line of sight from the array center to the source and the axis of the second and fourth elements. The phase difference between the signal arriving from the same source at the second element and at the fourth element is proportional to $\cos \beta$, where $\beta$ is as defined above. The relative bearing ($\beta$) from a protected aircraft to an intruding aircraft is found by measuring the phase difference between signals of the first element pair to determine $K \sin \beta$, measuring the phase difference between signals of the second element pair to determine $K \cos \beta$ and by deriving $\beta$ from $\tan^{-1}$ $$\left( \frac{K \sin\beta}{K \cos\beta} \right).$$

Interferometer arrays have been used heretofore to provide steering signals in certain homing systems for guided missiles. U.S. Pat. No. 3,181,813 for for Interferometer arrays have been used heretofore to provide steering signals in certain homing systems for guided missiles. U.S. Pat. No. 3,181,813 for for Interferometer Homing System" by J. F. Gulick et al., issued May 4, 1965 discloses one such example. In such systems, the steering signal is dependent upon the time rate of change of the relative bearing of the target from the missile, i.e. $d\beta/dt$. Since the time derivative of the target bearing angle is the information extracted from the array signals, rather than the bearing angle itself, the phase errors which are non-time varying and which have a large efffect on the accuracy of measurement of the bearing angle, have little, if any, effect on the derivative of the bearing angle simply because the phase errors are constant quantities, over the short term, and the derivative of a constant is zero.

When the interferoneter array is used to determine bearing angle, the phase errors of the measurement means cannot be ignored. moreover, such phase errors cannot be accounted for by factory calibration of the equipment, since the phase errors change with the age, temperature and other variables of the equipment.

It is an object of the present invention to provide a means for determining the relative bearing of a radio transmitter from a radio receiver, particularly for improving the performance of TCAS equipment.

It is another object of the invention to provide a direction finding antenna system based on phase comparison between signals received by spaced apart antenna elements in which means are provided for eliminating the effects of phase errors in the system.

It is a further object to provide a direction finding antenna system for determining the relative bearing of a transmitter from a receiver in which the accuracy of bearing angle measurement is not affected by the elevation angle of the transmitter relative to the receiver.

It is still another object of the invention to provide a direction finding antenna system for determining the relative bearing of a transmitter from a receiver in which the bearing measurement means is subtantially insensitive to amplitude variations in the received signal due to differences in the antenna patterns of the receiver antenna elements and which performs accurately at low signal to noise ratios.

SUMMARY OF THE INVENTION

Briefly, the invention comprises a direction finding receiving system on a protected aircraft in which a signal from an ATCRBS transponder on an intruder aircraft is received by a four element interferomerer type antenna array. The antenna elements are disposed in two pairs along perpendicular axes, with the axis of one pair preferably aligned with the heading axis of the aircraft. Each element of the array is connected through input reversing switches to individual receivers, the outputs of which are connected through output reversing switches to phase detectors. The input and output reversing switches operate in synchronism to interchange the receivers of an element pair while maintaining the connection of the proper element to the reference phase input of the phase detector. This arrangement enables determination of and correction for the difference in phase delay for the receivers of an element pair.

Other sources of error in measurement of the bearing angle are the inaccuracies of the phase detectors of the system. These are accounted for by means for calibrating the phase detectors at system power-up and periodically theraflter during operation. Such means include a pair of stable oscillators which inject calibration signals of slightly different frequency into the reference phase and variable phase inputs of the phase detectors. The calibration signals generate a linear sweep of the phase of inputs to the phase detectors throughout a 0°-360° range. Samplings of the phase detector outputs during calibration provide data for a look-up table used to correct the bearing measurement output of the phase detectors for the entire angular range of the detectors.

Further sources of errors in measurement of the bearing angle are differences in the phase delays through the transmission lines connecting the array elements to the receivers. These errors are determined and corrected by injecting isophase signals into both elements of an array pair. Any indicated phase difference between the signals from an element pair, after correction for receiver and phase detector errors, is then the result of differences in transmission line delays and such error is subtracted from each bearing measurement before presenting the final bearing measurement results.

DETAILED DESCRIPTION OF THE INVENTION

Figure 1A:
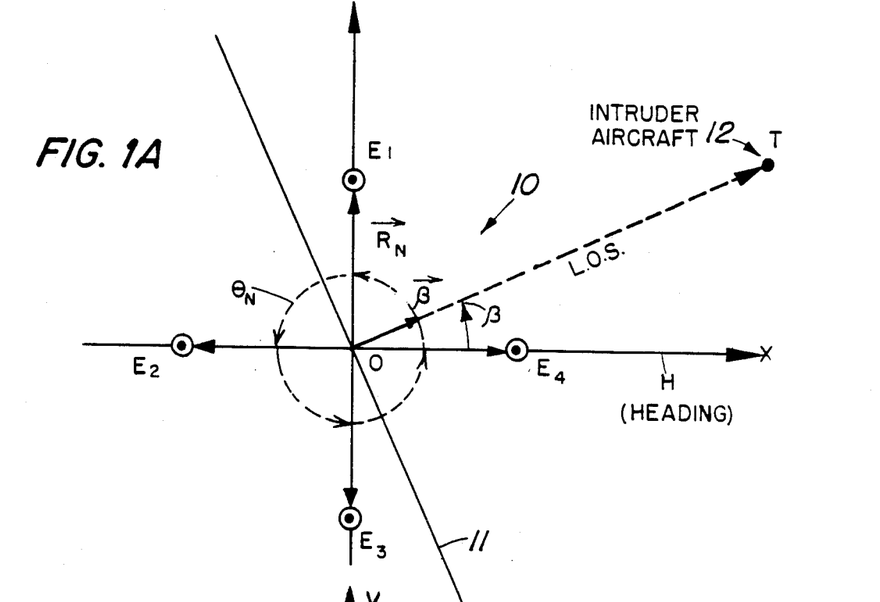
FIGS. 1A and 1B are diagrams helpful in explaining the theory of operation of the invention.

The operation of a four element interferometer-type antenna array in determining the relative bearing to a distant transmitter will be explained with reference to FIGS. 1A and 1B. Referring to FIG. 1A, the array 10 comprises four antenna elements $E_1$-$E_4$. Elements $E_2$ and $E_4$ are located on an axis H which is preferably aligned with the heading axis of the aircraft. Elements $E_1$ and $E_3$ are located on an axis Y which intersects axis H perpendicularly. Elements $E_1$-$E_4$ are each spaced equal distances, preferably one-quarter wavelength, from the intersecton O of axes H and Y. A transponder on an aircraft 12 located at T radiates electromagnetic waves along te line of sight (LOS) between the array center O and the point T. A plane wavefront 11 of the radiation from the transponder from aircraft 12 at point T is shown arriving at the center of the array axes. Wavefront 1 is perpendicular to the LOS, and is an arbitrary phase of the transmitted radiation to which the phases of signals received by the array elements will be referenced. The relative bearing from the protected aircraft upon which the array is located and distant aircraft 12 is the angle $\beta$ between H and LOS.

The locations of antenna elements $E_1$-$E_4$ are defined by position vectors $$\vec{R}_N \Big| \theta_N,$$

where $N = 1, 2, 3, 4$; and    (1)

$\theta_N = 2\pi N/4 \ N = 1, 2, 3, 4.$    (2)

$\vec{\beta}$ is a vector of unity length directed along the LOS at an angle $\beta$ to x axis; i and j are respectively unit vectors directed along the x and y axes.

The phase of the signal received by any of the elements $E_N$, $N=1, 2, 3, 4$, referenced to the array center, is the distance along the LOS, proprational to the wavelength $\lambda$, that a plane wave impinging on the element must travel to reach the array center, or must travel from the array center to impinge upon the element, multiplied by $2\pi$. Expressed in terms of fector algebra, the phase $\phi_N$, of the signal received by element $E_N$ is:

$$\phi_N = \frac{\vec{R}_N \cdot \vec{\beta}}{\lambda} \cdot 2\pi, \text{ where } \lambda \text{ is the wavelength.} \quad (3)$$

$$\vec{R}_N = r \cos \theta_N i + r \sin \theta_N j \quad (4)$$

$$\vec{\beta} = \cos\beta\, i + \sin\beta\, j \quad (5)$$

$$\vec{R}_N \vec{\beta} = r(\cos \theta_N \cos \beta\, i + \sin \theta_N \sin \beta\, j) \quad (6)$$

$$= r \cos(\theta_N - \beta); \text{ and} \quad (7)$$

$$\phi_n = \frac{2\pi r}{\lambda} \cos(\theta_N - \beta) \quad (8)$$

For element $E_1$, $E_2$, $E_3$ and $E_4$ $$\phi_1 = \frac{2\pi r}{\lambda} \cos\left(\frac{\pi}{2} - \beta\right) = \frac{2\pi r}{\lambda} \sin\beta = K \sin\beta \quad (9)$$

$$\phi_2 = \frac{2\pi r}{\lambda} \cos(\pi - \beta) = -\frac{2\pi r}{\lambda} \cos\beta = K \cos\beta \quad (10)$$

$$\phi_3 = \frac{2\pi r}{\lambda} \cos\left(\frac{3\pi}{2} - \beta\right) = -\frac{2\pi r}{\lambda} \sin\beta = K \sin\beta \quad (11)$$

$$\phi_4 = \frac{2\pi r}{\lambda} \cos(2\pi - \beta) = \frac{2\pi r}{\lambda} \cos\beta = K \cos\beta \quad (12)$$

The signals from elements $E_1$ and $E_3$ are amplified, limited and phase detected to provide a d.c. output proportional to:

$$\phi_1 - \phi_3 = K(\sin\beta - (-\sin\beta)) = 2K \sin\beta \quad (13)$$

Similarly, the signals from elements to $E_2$ and $E_4$ are phase detected to provide a d.c. outut proportional to:

$$\phi_4 - \phi_2 = K(\cos\beta - (-\cos\beta)) = 2K \cos\beta. \quad (14)$$

The phase detector outputs are converted to digital form, the quotient of the phase detector outputs is obtained and a look-up table is accessed to determine $\beta$ from:

$$\beta = \tan^{-1} \frac{2K \sin\beta}{2K \cos\beta} \quad (15)$$

The preceding analysis is applied to the case where the protected aircraft and intruder aircraft 12 are coplanar, i.e. at the same altitude. FIG. 1B applies to a three dimensional situation where intruder aircraft 12 is at a different altitude than the protected aircraft, i.e. the LOS intersects the x-y coordinate plane at an angle $\alpha$. The following brief analysis demonstrates that the effect of an elevation angle $\alpha$ is to reduce the amplitude of the phase detector outputs in proportion to $\cos\alpha$ without otherwise affecting the measurement of the bearing angle $\beta$.

Figure 1B:
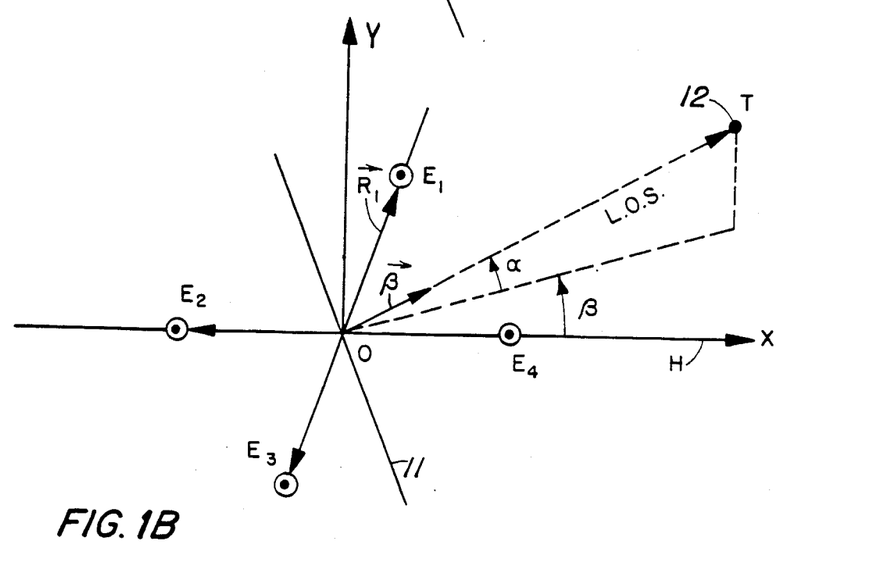

Referring to FIG. 1B, $\vec{R}_N$, $O_N$ are as defined before. $\vec{\beta}$ differs only in that it now has a component along the Z axis. Hence, $$\vec{\beta} = \cos\alpha \cos\beta\, i + \cos\alpha \sin\beta\, j + \sin k, \quad (16)$$

where k is a unit vector along the Z axis.

$$\vec{R}_N = r \cos\theta_N i + r \sin\theta_N j \quad (17)$$

$$\phi_N = \vec{R}_N \cdot \vec{\beta} / \lambda \cdot 2\pi \quad (18)$$

$$\vec{R}_N \cdot \vec{\beta} = r \cos\theta_N \cos\alpha \cos\beta i + r \sin\theta_N \cos\alpha \cos\beta j \quad (19)$$

$$= r \cos\alpha(\cos\theta_N \cos\beta + \sin\theta_N \sin\beta) \quad (20)$$

$$= r \cos\alpha \cos(\theta_N - \beta) \quad (21)$$

$$\phi_1 = K \cos\alpha \cos\left(-\frac{\pi}{2} - \beta\right) = K \cos\alpha \sin\beta \quad (22)$$

$$\phi_2 = K \cos\alpha \cos(\pi - \beta) = -K \cos\alpha \cos\beta \quad (23)$$

$$\phi_3 = K \cos\alpha \cos\left(\frac{3\pi}{2} - \beta\right) = -K \cos\alpha \sin\beta \quad (24)$$

$$\phi_4 = K \cos\alpha \cos(2\pi - \beta) = K \cos\alpha \cos\beta \quad (25)$$

$$K = \frac{2\pi r}{\lambda}$$

Then the first phase detector output is proportional to $$\phi_1 - \phi_3 = K \cos\alpha \sin\beta - (-K \cos\alpha \sin\beta) = 2K \cos\alpha \sin\beta \quad (26)$$

The second phase detector output is proportional to:

$$\phi_4 - \phi_3 = K \cos\alpha \cos\beta - (-K \cos\alpha \cos\beta) = 2K \cos\alpha \cos\beta \text{ and} \quad (27)$$

$$\beta = \tan^{-1} \frac{2K \cos\alpha \sin\beta}{2K \cos\alpha \cos\beta} \quad (28)$$

Figure 2A:
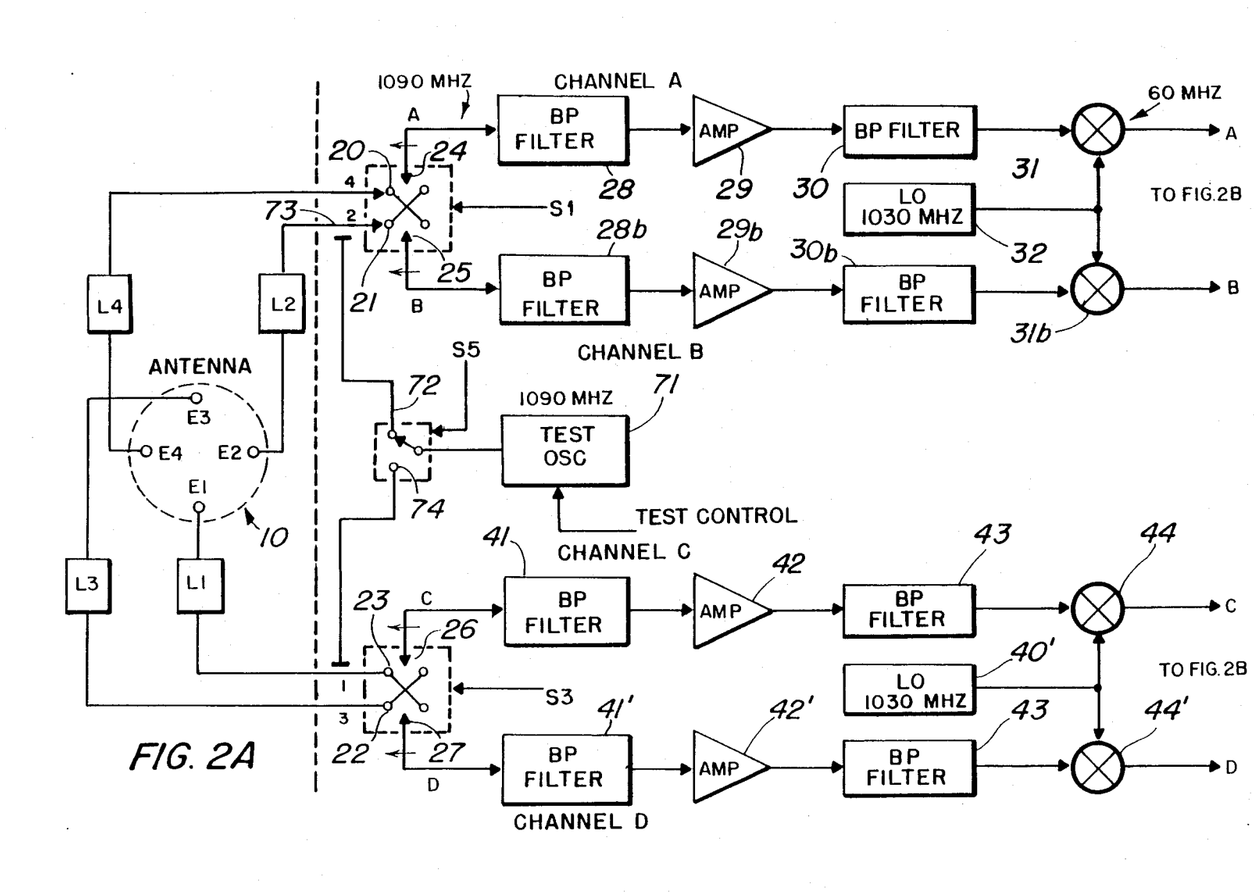
FIG. 2 is a functional block diagram of the invention.
Figure 2B:
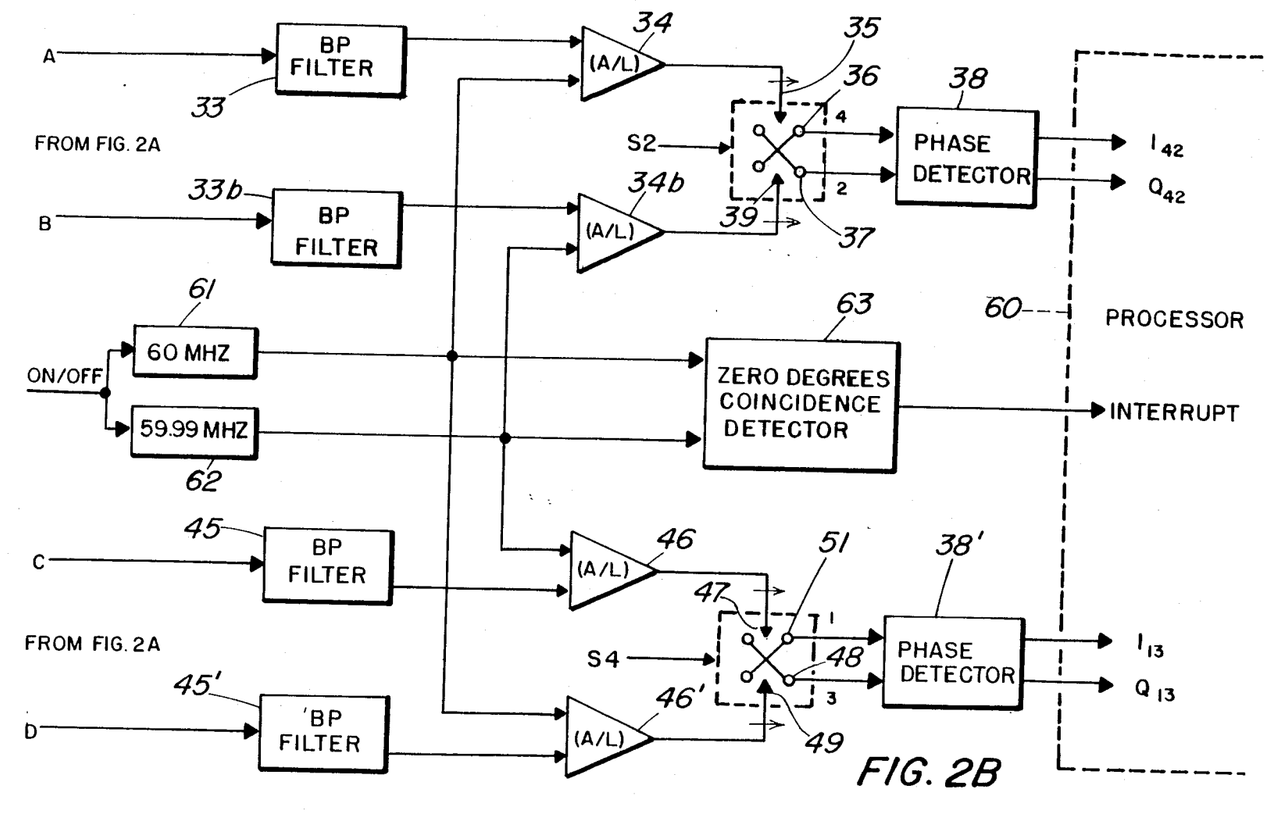

FIG. 2 is a functional block diagram of the invention. Antenna elements $E_1$–$E_4$ are connected through respective transisssion lines L1–L4 to the input contacts 20–23 of a pair of double pole-double throw type electronic switches S1, S3 connected as reverseing switches. Each pole 24–27 of switches S1 and S3 is connected to the input of an individual receiver channel A–D. The signals received by antenna 10 are at a frequency of 1090 MHz. Receiver channels A–D are identical with each channel, for example channel A, comprising an input bandpass filter 28, and r.f. amplifier 29 and an output bandpass filter 30. Filter 30 is followed by a mixer 31, which also receives an input from a local oscillator 32 operating at a frequency of 1030 MHz. Mixer 31 produces an i.f. signal at 60 MHz which is passed through a bandpass filter 33 centered on a frequency of 60 MHz. The output of filter 33 is amplified and limited in an amplifier-limiter 34, the output of which is applied to pole 35 of a double-pole, double throw electronic switch S2, similar to switch S1. Output contact 36 of switch S2 is connected to the reference phase input of a phase detector 38. Output contact 37 of switch S2 is connected to the variable phase input of phase detector 38.

Receiver channel B, beginning at switch S1 pole 25 and ending at switch S2 pole 39, is identical to receiver channel A. Switches S1, S2 are driven in synchronism, by means not shown, so that when pole 24 of switch S1 is in contact with input contact 20, pole 35 of switch S2 will be in contact with output contact 36. The signal received by antenna element $E_4$ is then processed by receiver channel A for application to the reference phase input of phase detector 38. At the same time, pole 25 of switch S1 will be in contact with input contact 21 and pole 39 of switch S2 will be in contact with output contact 37. The signal from antenna element $E_2$ will then be processed by receiver channel B for application to the variable phase input of phase detector 38.

During alternate half cycles of the switch driving means, pole 24 of switch S1 is in contact with input contact 21 and pole 35 of switch S2 is in contact with output contact 37. The signal from antenna element $E_2$ will then be processed by receiver channel A for application to the variable phase input of phase detector 38. Simultaneously, pole 25 of switch S1 is contact with input contact 20 and pole 39 of switch S2 is in contact with output contact 36. The signal from antenna element $E_4$ will then be processed by receiver channel B for application to the reference phase input of phase detector 38.

Receiver channels C and D, comprising respectively elements 41-46 and 41'-46' are each identical to receiver channel A described and switches S3, S4 are identical to and operate in synchronism with switches S1, S2. Local oscillator 40' is identical to local oscillator 32 and both local oscillators 32, 40' may be replace by a single local oscillator providing injection signals to mixes 31, 31$b'$, 44 and 44'. During one half cycle of the driving means for switches S3, S4, pole 26 of switch S3 is in contact with input contact 23 while pole 47 of switch S4 is in contact with input contact 51, thereby processing the signal received by antenna element $E_1$ through receiver channel C for application to the reference phase input of phase detector 38'. At the same time, pole 27 of switch S3 is in contact with input contact 22 and pole 49 of switch S4 is in contact with output contact 48, thereby processing the signal received by antenna element $E_3$ through receiver channel D for application to the variable phase input of phase detector 38'.

On the alternate half cycle of the driving means for switches S3, S4, poles 26 and 27 of switch S3 respectively engage contacts 22, 23 while poles 47 and 49 of switch S4 respectively engage contacts 48 and 51, thereby processing the signal received by antenna element $E_1$ through receiver channel D for application to the reference phase input of phase detector 38', while simultaneously processing the signal received by antenna element $E_3$ through receiver channel C for application to the variable phase input of phase detector 38'. Switches $S_1$ through $S_4$ alternate positions upon the transmission of each interrogation signal by the TCAS system aboard the protected aircraft. Such interrogations may occur at a rate between 38 and 200 per second, depending upon traffic conditions.

The S1, S2 means for interchanging receiver channels A and B for processing signals by antenna elements $E_2$, $E_4$ and similarly the S3, S4 means for interchanging channels C and D enable the determination of the difference in phase delays between receiver channels A and B and between receiver channels C and D and thus enable the correction of the errors introduced by such differences in the outputs of phase detectors 38, 38', as will later be more completely described.

PHASE DETECTOR CALIBRATION

The inaccuracy of the phase detectors used to mention the phase difference between the signals received by antenna elements $E_1$ and $E_3$ and between elemnts $E_2$ and $E_4$ has been mentioned as a source of error in the measurement of the relative bearing angle. The means for calibrating phase detectors 38, 38', operating in conjunction with microprocessor 60 will next be described. A stable oscillator 61 shown in FIG. 2 operating at a frequency of 60 MHz $+/-0.001\%$ provides an injection signal to amplifier-limiter 34 and to amplifier-limiter 46'. A second stable oscillator 62 operating at a frequency of 59.99 MHz $+/- 0.001\%$ provides an injection signal to amplifier-limiters 34$b$ and 46. Switches S2, S4 are positioned to connect amplifier-limiters 34, 46 to the reference phase input of their respective phase detectors 38, 38'. The difference between the frequencies of oscillators 61, 62 varies at the rate of $2\pi \times 10^4$ radians/sec. A zero degrees coincidence detector 63 detects the instant that the signals from oscillators 61 and 62 are in phase and furnishes an interrupt signal to processor 60 upon such occurrence. Interrupt signals therefore occur at the rate of $10^4$/sec.

Figure 3:
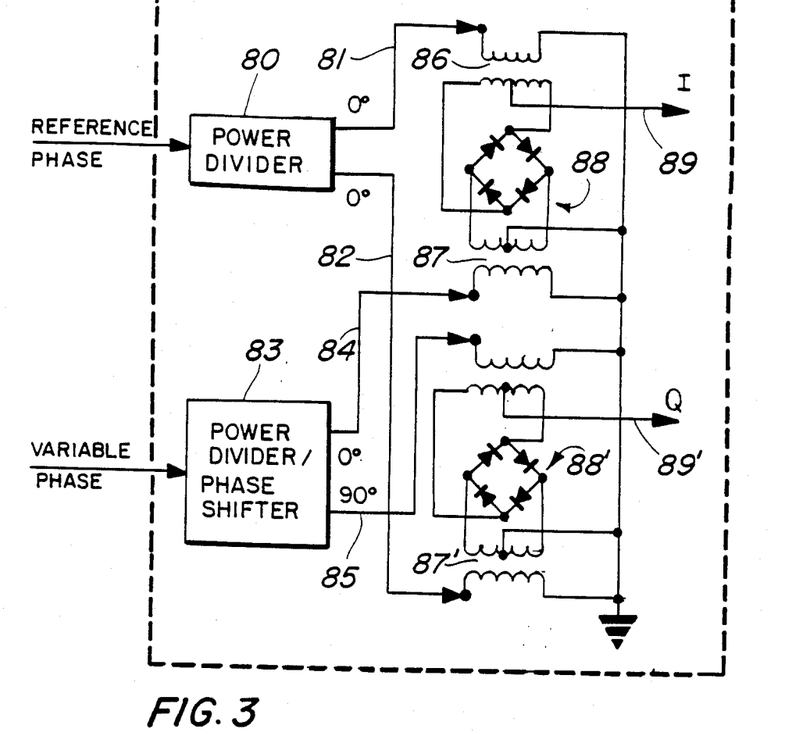
FIG. 3 is a schematic of phase detector 38 and 38' shown in FIG. 2.

Referring to FIG. 3, phase detectors 38, 38' each comprise a power divider 80 which receives the reference phase input from switch S2 or S4 and divides the same into two equal power, in phase outputs on lines 81 and 82. Power divider-phase shifter 83 receives the variable phase input from switch S2 and S4 and divides the same into two equal power outputs on lines 84 and 85 with the phase of the output on line 84 being in phase with the variable phase input and with the phase of the signal on line 85 being in quadrature thereto. Lines 81 and 84 are connected to the input windings 86, 87 of a conventional phase detector 88 which produces a d.c. output on line 89 proportional to the component of the variable phase input signal to power divider 83 which is in phase with the reference phase input to power divider 80.

Similarly, lines 82 and 85 are connected to input windings 86', 87' of phase detector 88' which produces a d.c. output on line 89' proportional to that component of the variable plase input signal to power divider/phase shifter 83 which is in quadrature to the reference phase input signal to power divider 80.

Figure 4:
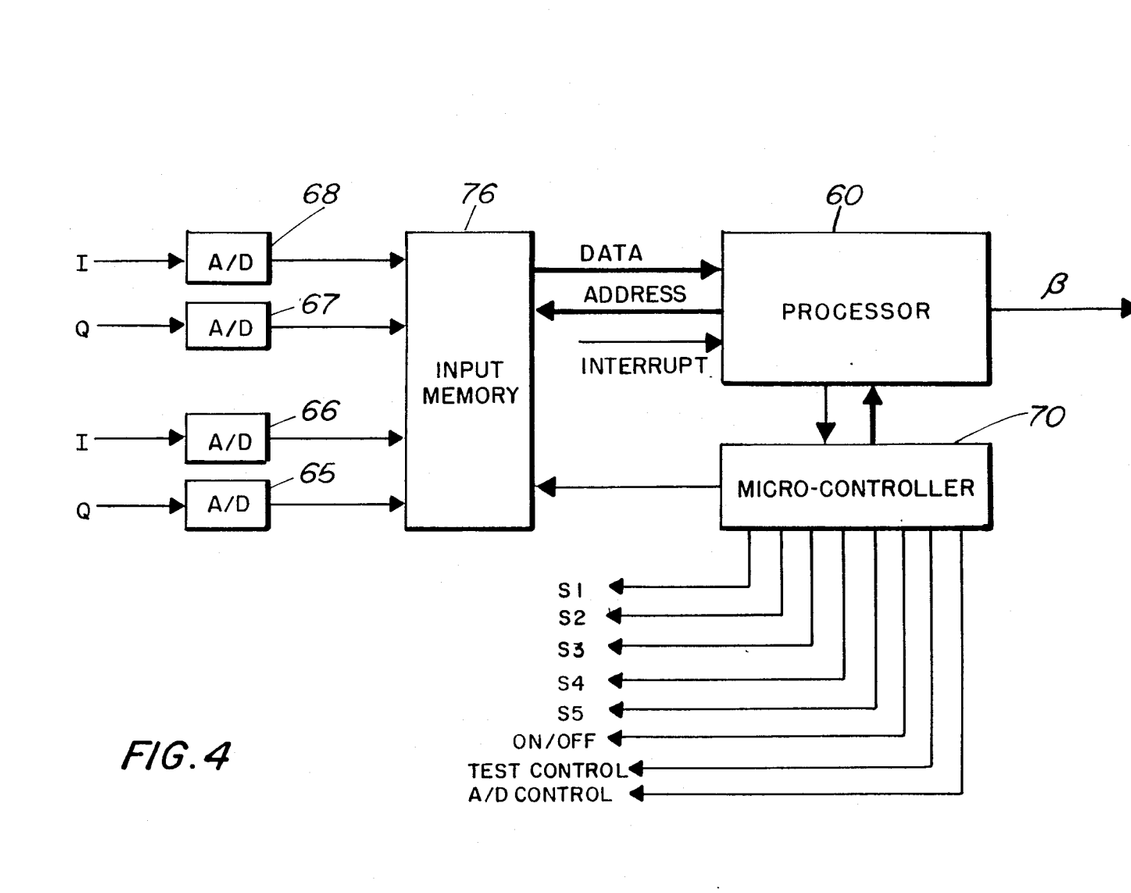
FIG. 4 is a functional block diagram of the data processing elements used in conjunction with FIG. 2.

Referring to FIG. 4, the I and Q outputs of phase detectors 38, 38' are applied to individual analog to digital converters 65-68. Upon receipt of an interrupt signal from detector 63, microcontroller 70 supplies sampling control signals to converters 65-68 by means not shown at a rate of 8 MHz to generate a sequence of linearly spaced samples of the I and Q inputs thereto. The samples are stored at a particular location in an input memory 76 and are processed as later described, by a processorb 60 to provide calibration data. The sequence is terminated upon the appearance of the next following interrupt signal from detector 63.

The sample sequence comprises 800 linearly spaced samples covering a span of 0°-360° phase difference between the reference phase and variable phase inputs to the phase detectors. In other words, the sample sequence provides calibration data of measured phase difference v. input phase difference at intervals of 0.045° throughout the span of 0°-360° input phase difference to the phase detectors. Any deparatures from a 1: relationship between input phase difference and measured phase difference at each calibration point is stored in a look-up table and used to correct phase detector output data obtained during the bearing measurement process.

TRANSMISSION LINE PHASE DELAY DIFFERENCES

As noted before, differences between the phase delays of transmissiion lines L1-L3 and L2-L4 may produce significant errors in the outputs of phase detectors 38, 38'. The means for determining and correcting such phase delay differences will next be described. Microcontroller 70 (FIG. 4) periodically actuates a test oscillator 71 shown in FIG. 2 operating at a frequency of 1090 MHz. The output of oscillator 71 is applied to the pole of a single pole, double throw electronic switch S5, also controlled by microcontroller 70. One output contact 72 of switch S5 is connected to a coupler 73 at the output end of transmission line L2. Output contact 74 of switch S5 is connected to coupler 75 at the end of transmission line L1. During operation of oscillator 71, switch S5 alternately energizes antenna elements $E_1$ and $E_2$ with the oscillator output. When antenna element $E_1$ is so energized, antenna elements $E_2$ and $E_4$, being equally spaced from element $E_1$, will receive isophase signals from oscillator 71. The signals received by elements $E_2$, $E_4$ are respectively conducted through transmission lines L2, L4 to the input contacts of switch S1 and thence, by operation of switches S1, S2, interchangeably through receiver channels A and B to the reference and variable phase inputs of phase detector 38. Any phase difference between the inputs then measured by phase detector 38, after correction for phase detector error and after correction for phase delay difference between receiver channels A and B in the manner described below, will then be due to the difference in phase delay between transmissions lines L2 and L4. Such corrected phase differences are stored in a look-up table and are used to further correct the outputs of phase detector 38 during the bearing measurement process.

Similarly, when switch S5 is in a position energizing antenna element $E_2$ with output from oscillator 71, isophase signals will be received by antenna elements $E_1$ and $E_3$. These signals proceed through transmission lines L1 and L3, switch S3, receiver channels C and D interchangeably, and switch S4 to the inputs of phase detector 38'. Data for a look-up table containing corrections for the phase delay difference between transmission lines L2 and L4 is thereby provided.

RECEIVER PAIR PHASE DIFFERENCE COMPENSATION

As mentioned above, a difference in the phase delay through the receiver channels supplying inputs to the phase detector possibly is the greatest contributor to errors in the measurement of bearing angle. Such receiver phase delay differences arise from several causes. One cause is a differential variation in receiver phase delays with temperature changes. Other causes are the differences between the phase delay versus the input signal frequency and between the phase delay versus the input signal amplitude characteristics of the receivers. The means described above including switches S1–S4 and receiver channels A–D permit compensation to be made for errors resulting from phase delay differences between the receivers in the following manner.

Considering receiver channels A and B, switch S1 is positioned to engage poles 24 and 25 with contacts 21 and 20, respectively, and switch S2 is positioned to engage poles 35 and 39 which contacts 36 and 37, respectively. The signal received by antenna element $E_4$ will then be processed through receiver channel B to the reference phase input of phase detector 38 while the signal received by antenna element $E_2$ will be processed by receiver channel A to the variable phase input of phase detector 38. A phase measurement identified as Phase AB is taken, utilizing formula 3, above. Phase AB, however, includes errors, as shown below:

Phase AB=Actual Phase+(Channel A Phase Delay-Channel B Phase Delay). (29)

Switches S1, S2 are next moved to their alternate positions connecting antenna element $E_2$ through receiver channel A to the reference input of phase detector 38 and antenna element $E_4$ through receiver channel B to the variable phase input of phase detector 38. The phase then measured by phase detector 38, identified as Phase BA, is:

Phase BA=Actual Phase+(Channel B Phase Delay-Channel A Phase Delay). (30)

The Actual Phase is found by the following:

Actual Phase=(Phase AB+Phase BA)/2. (31)

The difference between the receiver channel phase delays can be found by:

Channel A Phase Delay-Channel B Phase Delay=(Phase AB-Phase BA)/2. (32)

Calculation of the Actual Phase can be in error by an amount of 180° if the receiver channel phase delay difference exceeds the actual phase, as shown by the following example.

Let:

Actual Phase=0°; Channel A Phase Delay-Channel B Phase Delay=30°, then, the correct calculated actual phase is shown in Table I.

TABLE I

| Actual Phase | Phase AB | Phase BA | Actual Phase (Calculated) | Chan. A Phase Delay -Chan. B Phase Delay (Calculated) |
|---|---|---|---|---|
| 0 | 30 | 330 | 180 | −150 |

Provided that the difference between receiver channel phase delays is maintained less than 90°, the possible 180° error in the calculated actual phase can be avoided by application of the following rules.

(a) The receiver phase difference calculation should always be done by subtracting the larger of the Phase AB, Phase BA numbers from the smaller.

(b) If the result of the subtration per (a) is less than 90°, the actual phase calculated per equation (6) should be accepted.

(c) If the receiver phase delay difference calculated per (a) is greater than 90°, 360 should be added to the smaller of the Phase AB, Phase BA numbers before calculating the actual phase per equation (6).

Application of rules (a) (b) and (c) for the same conditions as in the preceding example yield the correct calculated actual phase is shown in Table II.

TABLE II

| Actual Phase Delay | Phase AB | Phase BA | Actual Phase (Calculated) | Chan. A Phase Delay -Chan. B Phase (Calculated) |
|---|---|---|---|---|
| 0 | 30 | 330 | 0 | 30 |

PHASE DETECTOR ANGLE CONVERSION AND CALCULATION

Revertingto the phase detector calibration procedure, described above, the sweep of the phase of the input voltage to the variable phase input to the input voltage to the reference phase input to phase detectors 38, 38' produces two sequences of sample data $I_{13}$, $Q_{13}$ and $I_{42}$, $Q_{42}$ which are temporarily stored in input memory 76 (FIG. 4). Processor 60 accesses this data to generate phase detector correction Tables 91, 92 (FIG. 7) employing the algorithm shown in FIG. 6.

The calibration procedure for phase detector 38' is identical to the calibration procedure for phase detector 38. The procedure for phase detector 38 only will be described.

Figure 5:
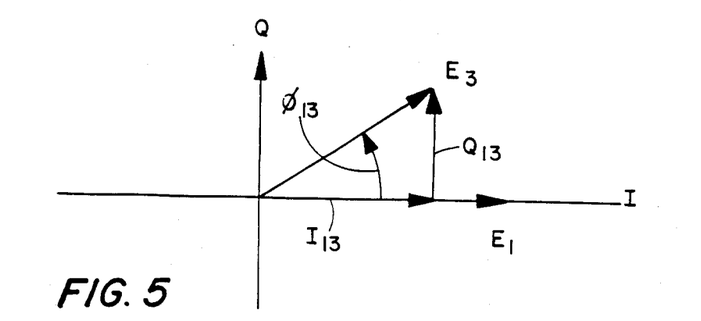
FIG. 5 is a vector diagram showing the relationship of the input voltages to phase detector 38 or 38'.

FIG. 5 is a vector diagram representative of the relationship between the voltage $E_1$ applied to the reference phase input and the voltage $E_3$ applied to the variable phase input of phase detector 38 at any sample point of the $I_{13}$, $Q_{13}$ calibration data sequence. For each $I_{13}$, $Q_{13}$ sample pair processor 60 performs the operations shown in FIG. 6. The ratio of the absolute values $Q_{13}$ to $I_{13}$ is obtained (94). If this ratio is less than unity, decision block 95 causes a look-up table (96) containing values of $\gamma = \arctan Q/I$ for angles from $0°-45°$ to be accessed. $\gamma$ is then applied to the logic shown in boxes 97-99 and the arithmetical operations 101-103 to produce an output on one of lines 104-107 for the proper quadrant of $\phi_{13}$.

Figure 6:
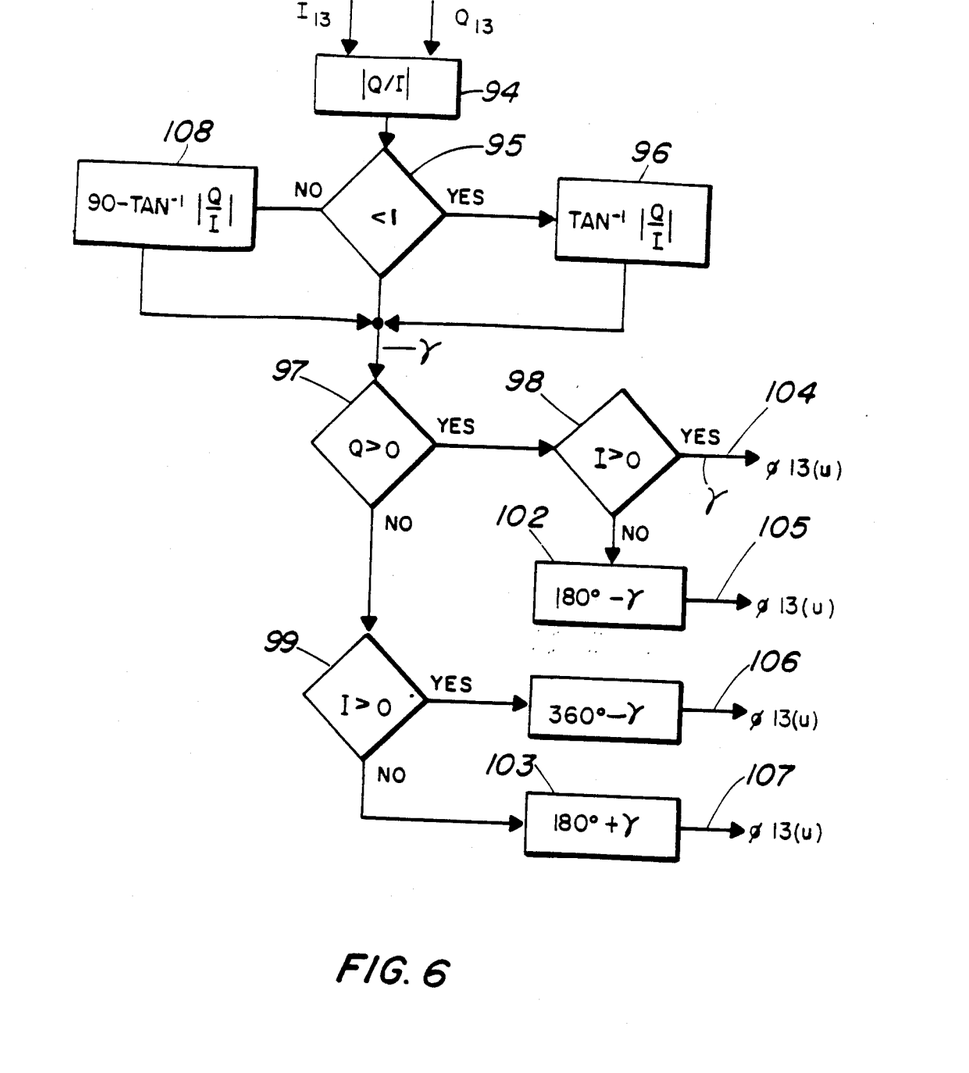
FIG. 6 is a logic diagram showing the process for computing phase angle from the output voltages of phase detector 38 or 38'.

If the ratio Q/I from block 94 is greater than unity, decision block 95 causes Q/I to be inverted and look-up Table 96 to be accessed with I/Q to provide the complement of $\gamma$. Operation 108 subtracts the complement of $\gamma$ thus obtained from $90°$ to provide the correct value of $\gamma$ for application to logic 97-99.

The resultant phase angle output $\phi_{13}(u)$ of the operations performed in accordance with FIG. 6 is uncorrected value of the phase angle between the input voltages to phase detector 38. These $\phi_{13}(u)$ outputs are corrected for entry into the phase detector correction Table 91 as corrected phase $\phi_{13A}$ by subtracting therefrom the difference between the uncorrected output phase and the input phase, that is:

$$\phi_{13A} = \phi_{13(u)} - (\phi_{13(u)} - \text{input phase}) \qquad (33)$$

The input phase for each $I_{13}$, $Q_{13}$ sample pair is a linear function of the sample number and the input phase increment per sample. In the example given in the description of phase detector calibration above, a total of 800 samples were taken for each calibration cycle resulting in a phase increment per sample of $360°/800 = 0.045°$. Therefore, $$\text{INPUT PHASE} = .045\, n,\ n = 0, 1 \ldots \frac{N-1}{N=800} \qquad (34)$$

After the phase detector correction Table 92 is filled in with values of $\phi_{13(A)}$, it is only necessary to access Table 91 with the $I_{13}$, $Q_{13}$ outputs of phase detector 38 obtained during measurement of the bearing angle $\beta$, with due regard to the signs of such components, to obtain $\phi_{13(A)}$.

Figure 7:
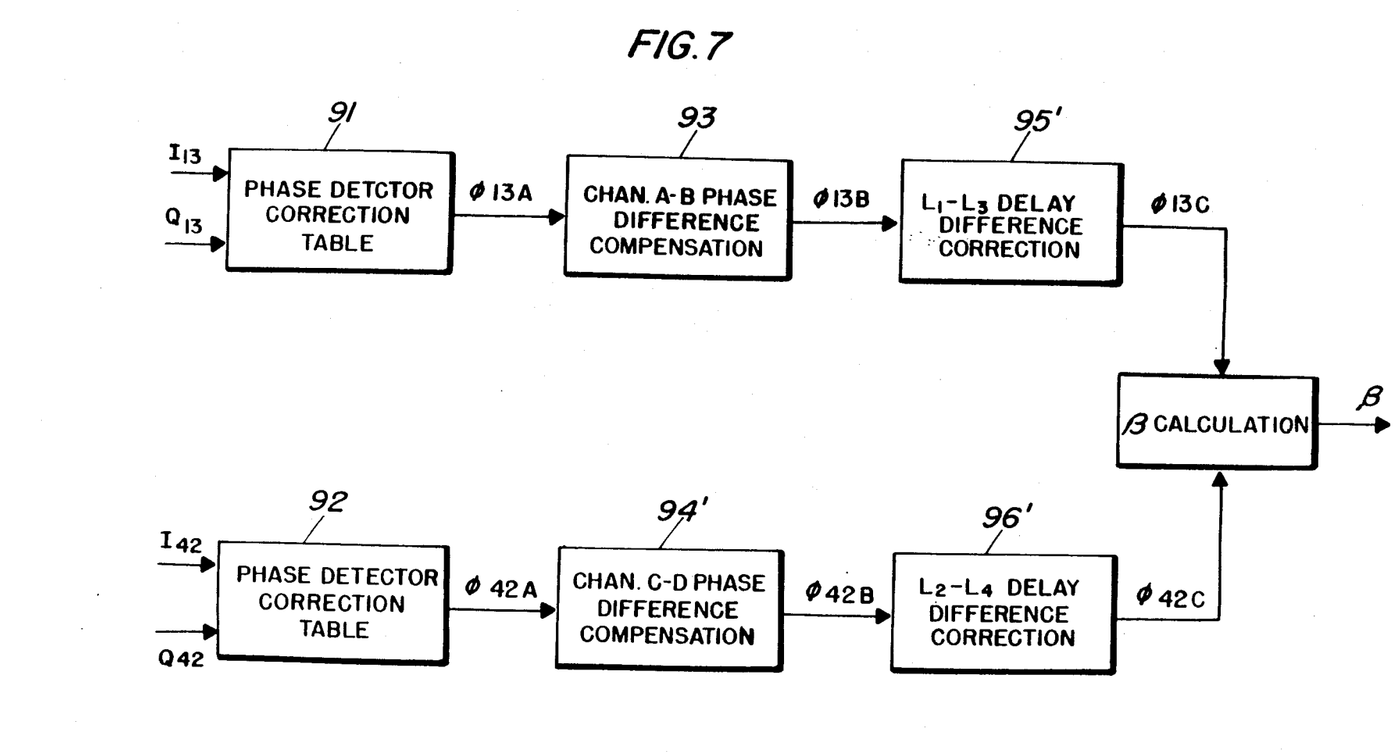
FIG. 7 is a flow diagram showing the corrections applied to the outputs of phase detectors 38 and 38' and the computation of the bearing angle.

After the phase detector calibration is completed and the transmission line phase delay error is determined, as described above, the system is returned to normal operation. Referring to FIG. 7, the $I_{13}$, $Q_{13}$ outputs of phase detector 38 and $I_{42}$, $Q_{42}$ outputs of phase detector 38' obtained from reception of transmissions from an intruder aircraft are used to address phase detector correction Tables 91 and 92, respectively, to obtain $\phi_{13A}$ and $\phi_{42A}$, each of which includes corrections for phase detector non-linearities, as described above. Successive pairs of measurements of $\phi_{13A}$ and $\phi_{42}$ are respectively processed 93, 94' as described in the section above headed "Receiver Pair Phase Difference Compensation" 0 to yield $\phi_{13B}$ and $\phi_{42B}$ termed "Actual Phase" in the above-referenced section. $\phi_{13B}$ and $\phi_{42B}$ are then respectively corrected 95', 96' for differences between the phase delays of transmission lines $L_1-L_3$ and $L_2-L_4$. These corrections are obtained in the manner described in the section above headed "Transmission Line Phase Delay Differences". The resultant $\phi_{13C}$ and $\phi_{42C}$ are used to compute the bearing angle $\beta$. The angle $\beta$ is calculated in a similar manner to that described above, with reference to FIG. 6, for calculating $\phi_{13(u)}$, with the differences that $\phi_{13C}$ is substituted for $Q_{13}$, $\phi_{42C}$ is substituted for $I_{13}$ and that the output on one of lines 104-107 is $\beta$.

It will be understood that the system of the invention interfaces with the computer of the TCAS system aboard the protected aircraft to provide the additional information of the bearing angle $\beta$ of an intruder aircraft 12 which is utilized by the TCAS computer, along with other information, to assess the collision threat of the intruder aircraft 12. Neither the interface nor the TCAS computer forms a part of the present invention.

It will be understood that the invention may be practiced otherwise than as specifically described herein without departing from the spirit and scope of the appended claims.

The invention claimed is:

1. A direction finding antenna system for determining the relative bearing of an intruder aircraft from a protected aircraft in conjunction with a Traffic Alert Collision Avoidance System (TCAS), the intruder aircraft being equipped to transmit signals received by said antenna system, comprising first and third spaced apart antennas mounted aboard the protected aircraft;

first and third receivers aboard the protected aircraft for amplifying, converting and limiting the signals received by said first and third antennas;

first switching means at the inputs to said first and third receivers for interchangeably applying the signals received by said first and third antennas to the inputs of said first and third receivers;

second switching means at the outputs of said first and third receivers;

a first phase detector having a reference phase input and a variable phase input, said inputs to said first phase detector being connected to said second switching means, said second switching means operating in synchronism with said first switching means so that in a first position of said first switching means signals from said first and third antennas are applied to said first and third receivers, respectively, and in a first position of said second switching means the outputs of said first and third receivers are applied respectively to said reference phase and said variable phase inputs to said first phase detector and in a second position said first switching means signals from said first and third antennas are applied to the inputs of said third and first receivers, respectively, in a second position of second switching means the outputs of said third receiver and said first receiver are applied respectively to said reference phase and variable phase inputs to said first phase detector; and first means for processing the outputs of said first phase detector obtained in alternate operations of said first and second switching means to eliminate the errors therein caused by a difference between the phase delays of signals passing through said first and third receivers, the result of said processing means being a first quantity related to the relative bearing to the intruder aircraft from the protected aircraft.

2. An antenna system as claimed in claim 1, with additionally;

second and fourth antennas mounted aboard the protected aircraft, said first, second, third and fourth antennas being mounted in cruciform configuration;

second and fourth receivers aboard the protected aircraft for amplifying, convering and limiting the signals received by said second and fourth antennas;

third switching means at the inputs to said second and fourth receivers for interchangeably applying the signals received by said second and fourth antennas to the inputs of said second and fourth receivers;

fourth switching means at the outputs of said second and fourth receivers;

a second phase detector having a reference phase input and a variable phase input, said inputs to said second phase detector being connected to said fourth switching means, said fourth switching means operating in synchronism with said third switching means so that in a first position of said third switching means signals from said second and fourth antennas are applied to said second and fourth receivers, respectively, and in a first position of said fourth switching means the outputs from said second and fourth receivers respectively are applied to said variable phase and said reference phase inputs to said second phase detector and in a second position of said third switching means signals from said second and fourth antennas are applied to said fourth and second receivers, respectively, and in a second position of said fourth switching means the outputs from said second and fourth receivers are applied, respectively, to said variable phase and said reference phase inputs to said second phase detector; and second means for processing the outputs of said second phase detector obtained in alternate operations of said third and fourth switching means to eliminate errors therein caused by a difference between the phase delays of signals passing through said second and fourth receivers, the result of said second processing means being a second quantity related to the relative bearing to the intruder aircraft from the protected aircraft.

3. An antenna system as claimed in claim 2, with additionally, third means for processing the results of said first and second processing means to obtain the relative bearing angle to the intruder aircraft from the protected aircraft.

4. An antenna system as claimed in claim 1, with additionally:

first means for determining errors in said ouputs of said first phase detector due to non-linear operation of said first phase detector; and first means for correcting said outputs of said first phase detector in accordance with the errors therein determined by said last named first means.

5. An antenna system as claimed in claim 2, wth additionally:

second means for determining errors in said outputs of said second phase detector due to non-linear operation of said second phase detector; and second means for correcting said outputs of said second phase detector in accordance with the errors therein determined by said last named second means.

6. An antenna system as claimed in claim 1 wherein:

the output of said first phase detector is identified as Phase AB when said first and second switching means are in their said first positions; and the output of said first phase detector is identified as Phase BA when said first and second switching means are in their second positions; and wherein said means for processing the outputs of said first phase detector includes means for solving the algorithm:

First Actual Phase =(Phase AB+Phase BA) 2, said First Actual Phase being said first quantity.

7. An antenna system as claimed in claim 2 wherein:

the output of said second phase detector is identified as Phase CD when said third and fourth switching meas are in their said first positions; and the output of said second phase detector is identified as Phase DC when said third and fourth switching means are in their second positons; and wherein said means for processing the outputs of said second phase detector includes means for solving the algorithm:

Second Actual Base=(Phase CD+Phase DC) 2, said Second Acual Phase =(Phase CD+Phase DC) 2

Said Second Actual Phase being said second quantity.

8. antenna system as claimed in claim 7, with additionally:

third means for processing said First Actual Phase and said Second Actual Phase to obtain the relative bearing to the intruder aircraft from the protected aircraft.

9. An antenna system as claimed in claim 1, wherein:

said first and third antennas are connected to said first shitching means by first and third transmission lines; and with additionlly, first means for determining the difference between the phase delays of signals passing through said first and third transmission lines; and means for correcting said outputs of said first phase detector in accordance with said difference determined by said last named first means.

10. An antenna system as claimed in claim 2, wherein:

said second and fourth antennas are conected to said third switching means by second and fourth transmission lines; and with additionally, second means for determining the difference between the phase delays of signals passing through said second and fourth tranmission lines; and means for correcting said outputs of said second phase detector in accordance with said diffence determined by said last named second means.

11. An antenna system as claimed in claim 9 wherein:

said first means for determining the difference between the phase delays of signals passing through said first and second transmission lines includes:
a test oscillator; and
first means for radiating isophase signals from said thest oscillator for reception by said first and third antennas.

12. An antenna system as claimed in claim 10 wherein:
said second means for dermining the difference between the phase delays of signals passing through said second and fourth transmission lines includes:
a test oscillator; and
second means for radiating isophase signals from said test oscillator for reception by said second and fourth antennas.

13. An antenna system as claimed in claim 12, wherein:
there is but a single test oscillator, and
said first means for radiating signals from said test oscillator includes means for applying signals from said single test oscillator to said second antenna for radiation; and wherein
said second means for radiating signals from said test oscillator includes means for applying signals from said single test oscillator to said second antenna for radiation.

14. An antenna system as claimed in claim 4, wherein:
said first means for determining errors in said outputs of said first phase detector includes:
means for applying a first alternating test voltage to said reference phase input of said first phase detector;
means for applying a second alternating test voltage to said variable phase input of said first phase detector, said second test voltage having a phase relationship to said first test voltage which varies linearly with time; and
first means for periodically sampling the output of said first phase detector to provide a first sequence of output data samples which are equally spaced in time.

15. An antenna system as claimed in claim 5, wherein:
said second means for determining errors in said outputs of said second phase detector includes:
means for applying a third alternating test voltage to said reference phase input of said second phase detector;
means for applying a fourth alternating test voltage to the variable phase input of said second phase detector, said fourth test voltage having a phase relationship to said third test voltage which varies linearly with time; and
second means for periodically sampling the output of said second phase detector to provide a second sequence of output data samples which are equally spaced in time.

16. An antenna system as claimed in claim 14 wherein:
said first test voltage is derived from a first table oscillator operating at a first frequency; and
said second test voltage is derived from a second stable oscillator operating a second frequency different from said first frequency.

* * * * *